Oct. 19, 1937.  A. PERRON  2,096,060
INDEPENDENT WHEEL SUSPENSION FOR AUTOMOBILES
Original Filed Oct. 3, 1935
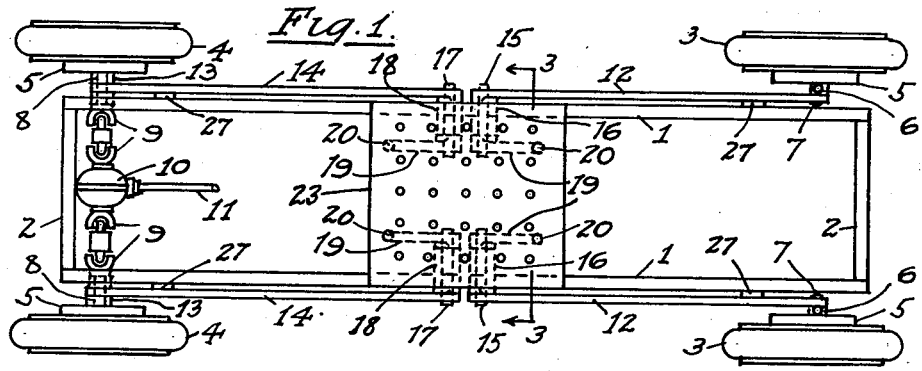
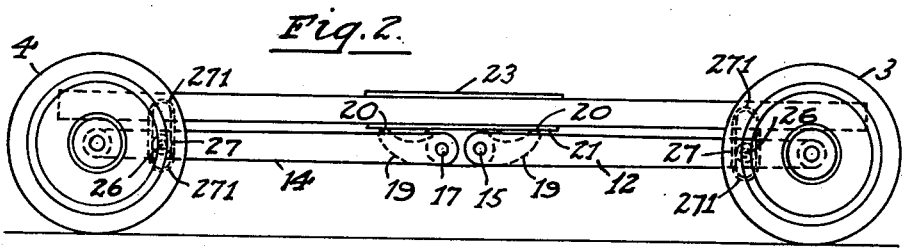
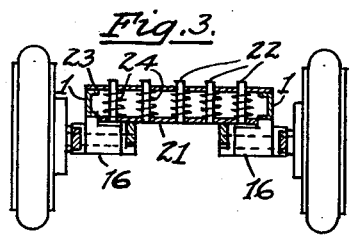
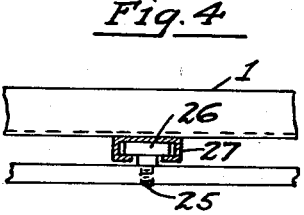
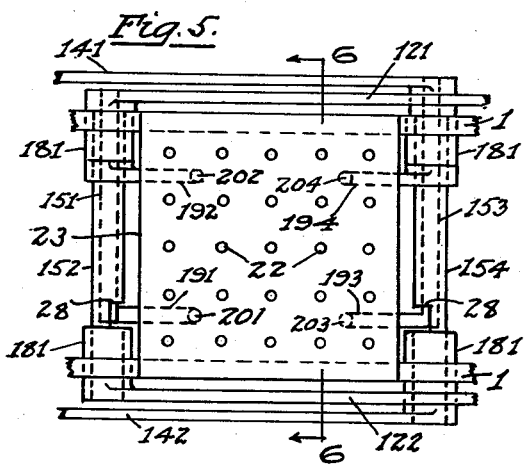
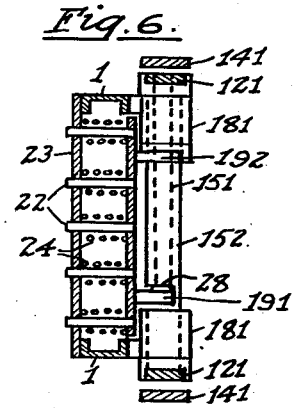
INVENTOR:-
Adrian Perron Patented Oct. 19, 1937

2,096,060

UNITED STATES PATENT OFFICE 2,096,060

INDEPENDENT WHEEL SUSPENSION FOR AUTOMOBILES

Adrian Perron, Detroit, Mich.

Application October 3, 1935, Serial No. 43,318
Renewed February 10, 1937

2 Claims. (Cl. 280—104)

My invention relates to independent wheel suspensions for automobiles, and its principal object is to provide means whereby each individual wheel is capable of independently moving to accommodate itself to inequalities and variations in road surfaces.

In devices of this character as hitherto constructed each of the several wheels has been mounted upon a vertically or radially movable supporting element and each of the elements has been provided with a separate resilient cushioning means.

Another object of my invention is to provide a construction to which all of the wheel supporting elements are arranged to react upon a common centrally disposed spring element, whereby the construction is very much simplified and the cost of manufacture reduced, and at the same time a more efficient operation is obtained.

With these and other objects in view, I will now describe a preferred embodiment of my said invention with reference to the accompanying drawing in which—

Figure 1 is a plan view showing the chassis of an automobile showing the general arrangement of the essential parts.

Figure 2 is a side elevation of the same.

Figure 3 is a section on line 3—3 of Figure 1.

Figure 4 is a fragmentary plan view, partly in section, illustrating one method of guiding the wheel supporting elements, drawn to an enlarged scale.

Figure 5 is a fragmentary plan view showing a modification, and

Figure 6 is a section on line 6—6 of Figure 5.

Like characters designate corresponding parts throughout the several views.

1, 1 are the side members of the chassis frame and 2, 2 are transverse members which connect the same. 3, 3 are the front wheels and 4, 4 the rear wheels, each of the said wheels being provided with a brake drum 5 and associated brake mechanism, the latter being omitted from the drawing since they form no part of the present invention. The front wheels 3, 3 are pivoted at 6, 6 to short axles 7 and are provided with any conventional steering mechanism, not shown. The wheels 4, 4 are mounted upon short axles 8 which are connected by flexible couplings 9 to the centrally disposed differential gear 10, of any ordinary construction, driven from the motor by the usual propeller shaft 11 and its associated gear shift mechanism. The front axles 7 are rigidly connected to substantially horizontal levers 12, while the rear axles 8 are mounted in bearings 13 which are rigidly connected to levers 14, 14. Levers 12, 12 are keyed upon short transverse shafts 15 mounted in bearings 16 upon the chassis, and the levers 14, 14 are keyed upon similar shafts 17, 17 supported in bearings 18, the bearings 16 and 18 on each side being preferably formed in a single structure bolted or otherwise secured to the underside of the chassis frame. On the inner ends of the shafts 15 and 17 are keyed short levers 19 which are in general of arcuate form and are provided with rounded convex extremities 20 which normally rest upon the underside of a plate 21. The plate 21 is provided with a series of vertical pins or guide members 22 which are slidably mounted in an upper plate 23 rigidly secured to the chassis frame, and between the plates 21 and 23 are a series of helical springs 24 which surround the pins 22 and are held in position thereby, the arrangement being such that vertical movements of the extremities 20 of the levers 19 are imparted to the plate 21 and resisted by the springs 24, so that each wheel is at all times maintained in contact with the supporting road surface.

In order to prevent lateral displacement of the levers due to the side stresses upon the respective wheels, each of the levers 12, 12, 14, 14 is provided with a stud 25 having an enlarged head 26 of circular or other shape adapted to slidably engage in a channel-like member 27 secured to the corresponding chassis frame member 1, as shown more in detail in Figure 4 of the drawing. The member 27 is further provided with closed ends 271 by which the vertical movement of the lever is limited.

In the modification shown in Figures 5 and 6 the reaction from each wheel, instead of being taken upon the corner of the plate 21 adjacent thereto as shown in Figures 1 to 4, inclusive, is taken upon the corner diagonally opposite thereto. For example, as more clearly indicated in Figure 5, reaction from the lever 121 is applied to the plate at 201, while the reaction from the lever 122 is applied at 202. Similarly, reaction from the lever 141 is applied at 203 and from the lever 142 at 204. In order to effect this the lever 121 is keyed to a shaft 151 to which is secured the short lever 191, while the lever 122 is keyed upon a sleeve 152 which surrounds the shaft 151, the said sleeve carrying the short lever 192 as shown. Similarly, the lever 141 is keyed upon a shaft 153 which carries the lever 193, and the lever 142 is keyed upon the sleeve 154 which carries the short lever 194. It will be observed that the sleeves 152 and 154 are slotted at 28, allowing the short levers 191 and 193 to project therethrough. It will be understood that the bearings 181 are formed with an enlarged bore in which the sleeves 152 and 154 are oscillably mounted.

It will be observed from the foregoing description and by reference to the drawing that I have provided instrumentalities which are eminently adapted to the purpose outlined, and while I have herein described a preferred embodiment of my invention, it will be readily understood by those skilled in the art to which the same refers that changes in detail may be made to meet different requirements without departing from the spirit of my invention as defined in the appended claims.

What I claim and desire to secure by Letters Patent of the United States is:

1. A suspension for motor-driven vehicles comprising, in combination, a chassis frame, a pair of transverse shafts oscillably supported upon said frame, a pair of forwardly extending lever arms each secured to one of said shafts, a pair of independent front axles upon the free ends of said lever arms, wheels mounted upon said axles, a second pair of transverse shafts oscillably supported upon said frame, a pair of rearwardly extending lever arms each secured to one of said last-mentioned shafts, a pair of independent rear axles upon the free ends of said lever arms, wheels mounted upon said rear axles, means for maintaining said lever arms in parallel relationship with said frame, a substantially central yieldingly supported member upon said frame, and levers upon said transverse shafts adapted to bear upon said member whereby vertical movement of said lever arms and said wheels is resisted.

2. A suspension for motor-driven vehicles comprising, in combination, a chassis frame, a pair of transverse shafts oscillably supported upon said frame, a pair of forwardly extending lever arms each secured to one of said shafts, a pair of independent front axles upon the free ends of said lever arms, wheels mounted upon said axles, a second pair of transverse shafts oscillably supported upon said frame, a pair of rearwardly extending lever arms each secured to one of said last-mentioned shafts, a pair of independent rear axles upon the free ends of said lever arms, wheels mounted upon said rear axles, a substantially central, horizontally disposed member fixed to said frame, a plate arranged in parallel spaced relation with said member, a plurality of compression springs between said plate and said member, and levers upon said transverse shafts adapted to bear upon said plate whereby vertical movement of said lever arms and said wheels is resisted.

ADRIAN PERRON.